US010590890B2

(12) United States Patent
Yudanov

(10) Patent No.: US 10,590,890 B2
(45) Date of Patent: Mar. 17, 2020

(54) INLET SYSTEM FOR AN INTERNAL COMBUSTION ENGINE

(71) Applicant: VOLVO TRUCK CORPORATION, Gothenburg (SE)

(72) Inventor: Sergi Yudanov, Västra Frölunda (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 0 days.

(21) Appl. No.: 16/092,322

(22) PCT Filed: May 4, 2017

(86) PCT No.: PCT/EP2017/060602
§ 371 (c)(1),
(2) Date: Oct. 9, 2018

(87) PCT Pub. No.: WO2017/194375
PCT Pub. Date: Nov. 16, 2017

(65) Prior Publication Data
US 2019/0257273 A1     Aug. 22, 2019

Related U.S. Application Data

(63) Continuation-in-part of application No. PCT/EP2016/060302, filed on May 9, 2016.

(51) Int. Cl.
*F02M 26/05* (2016.01)
*F02M 26/22* (2016.01)
(Continued)

(52) U.S. Cl.
CPC ............ *F02M 26/05* (2016.02); *F02B 29/04* (2013.01); *F02B 37/00* (2013.01); *F02C 6/12* (2013.01);
(Continued)

(58) Field of Classification Search
CPC .. F02M 26/05; F02M 35/10222; F02M 25/06; F02M 26/35; F02M 26/22;
(Continued)

(56) References Cited

U.S. PATENT DOCUMENTS

2002/0124553 A1* 9/2002 Lucas .................... F01N 3/037
60/278
2009/0000297 A1   1/2009 Joergl et al.
(Continued)

FOREIGN PATENT DOCUMENTS

DE        4213047 A1   10/1993
DE   102006054227 A1    5/2008
(Continued)

OTHER PUBLICATIONS

International Search Report (dated Sep. 14, 2017) for corresponding International App. PCT/EP2017/060602.

*Primary Examiner* — Hoang M Nguyen
(74) *Attorney, Agent, or Firm* — Venable LLP; Jeffri A. Kaminski

(57) ABSTRACT

An inlet system for an internal combustion engine is provided and includes a compressor including a rotor, and an air guide arranged to guide an air flow from an air inlet to at least one cylinder of the engine via the compressor. The inlet system also includes at least two fluid sources, and at least two fluid guiding elements each arranged to guide a fluid from a respective of the fluid sources to the air guide, between the air inlet and an outlet of the compressor, that the fluid guiding elements present a first conduit for guiding a fluid from a first of the fluid sources, and a second conduit for guiding a fluid from a second of the fluid sources, and that a restriction of a flow of the fluid from the first fluid source is provided by a downstream end of the first conduit and the rotor, whereby a downstream end of the second conduit is arranged so that a pressure drop provided by the (Continued)

restriction drives fluid through the second conduit towards the downstream end of the second conduit.

29 Claims, 8 Drawing Sheets

(51) Int. Cl.
F02M 26/35 (2016.01)
F02M 29/04 (2006.01)
F02B 37/00 (2006.01)
F02C 6/12 (2006.01)
F02M 25/06 (2016.01)
F02M 35/10 (2006.01)
F02B 29/04 (2006.01)

(52) U.S. Cl.
CPC ............ *F02M 25/06* (2013.01); *F02M 26/22* (2016.02); *F02M 26/35* (2016.02); *F02M 35/10222* (2013.01); *F05D 2220/40* (2013.01)

(58) Field of Classification Search
CPC .... F02M 26/09; F02M 25/028; F02M 25/035; F02C 6/12; F02B 37/00; F02B 29/04; F05D 2220/40; Y02T 10/144; Y02T 10/121; F04D 29/4213

USPC .................................................. 60/605.1–612
See application file for complete search history.

(56) References Cited

U.S. PATENT DOCUMENTS

2011/0048003 A1* 3/2011 Chen ....................... F04D 25/04
                                                              60/605.2
2014/0083398 A1   3/2014 Marceno et al.
2015/0192133 A1*  7/2015 An .......................... F02B 37/225
                                                              415/203
2017/0284421 A1* 10/2017 Wade ............... F02M 35/10157

FOREIGN PATENT DOCUMENTS

| DE | 10200805308 | A1 | 7/2009 |
| DE | 102010054478 | A1 | 6/2012 |
| DE | 102011108458 | A1 | 1/2013 |
| DE | 202013005847 | A1 | 10/2014 |
| EP | 1391677 | A2 | 2/2004 |
| EP | 2570629 | A1 | 3/2013 |
| EP | 2781716 | A1 | 9/2014 |
| FR | 2922961 | A1 | 5/2009 |
| FR | 2936023 | A1 | 3/2010 |
| WO | 2015098391 | A1 | 7/2015 |

* cited by examiner

INLET SYSTEM FOR AN INTERNAL COMBUSTION ENGINE

BACKGROUND AND SUMMARY

The invention relates to an inlet system for an internal combustion engine, and internal combustion engine system and a vehicle.

The invention can be applied in heavy-duty vehicles, such as trucks, buses and construction equipment. Although the invention will be described with respect to a heavy-duty vehicle, the invention is not restricted to this particular vehicle, but may also be used in other vehicles such as a car.

In internal combustion engine systems, e.g. for heavy duty vehicles, water may form due to condensation, which water may accumulate and cause problems to the operation of the system. EP1391677 describes a charge air cooler with a condensate outlet opening which is connected to an upstream side of an air charger. However, there is a desire to further reduce possibilities of problems caused by liquid formation in an internal combustion engine system.

It is desirable to reduce risks of problems in internal combustion engine systems due to liquid formation. It is desirable also to improve the function of internal combustion engine inlet systems with fluid conduits leading to air inlets of the systems.

An aspect of the invention provides an inlet system for an internal combustion engine, comprising a compressor comprising a rotor, and an air guide arranged to guide an air flow from an air inlet to at least one cylinder of the engine via the compressor, characterized in that the inlet system comprises at least two fluid sources, and at least two fluid guiding elements each arranged to guide a fluid from a respective of the fluid sources to the air guide, between the air inlet and an outlet of the compressor, that the fluid guiding elements present a first conduit for guiding a fluid from a first of the fluid sources, and a second conduit for guiding a fluid from a second of the fluid sources, and that a restriction of a flow of the fluid from the first fluid source is provided by a downstream end of the first conduit and the rotor, whereby a downstream end of the second conduit is arranged so that a pressure drop provided by said restriction drives fluid through the second conduit towards the downstream end of the second conduit.

By providing at least two fluid guiding elements arranged to guide fluid from a respective of at least two fluid sources, the possibilities of reducing risks of liquid formation, e.g. due to condensation, causing operational problems is greatly reduced. By the fluid guiding elements being arranged to guide the fluid into the air guide, the water may be used for suppression of NOx formation during the engine operation. Where the engine system comprises a multi cylinder engine, the distribution of the fluid upstream of the compressor, or at least upstream of the outlet of the compressor, may provide an advantageous atomization of condensation liquid from various fluid sources for a better distribution between the engine cylinders.

It is understood that a first of fluid guiding elements may present the first conduit, and a second of fluid guiding elements may present the second conduit.

Said restriction will increase the local fluid speed and decrease the pressure at the end of the first conduit. This pressure drop drives fluid through the second conduit towards the downstream end of the second conduit. This is particularly advantageous where pressure at the first fluid source is relatively high, and the pressure at the second fluid source is relatively low. Thus, where the pressure in the second fluid source is insufficient to drive the fluid therefrom to the air guide, the flow from the first fluid source may be used to drive the flow from the second fluid source.

The downstream end of the second conduit being arranged so that the pressure drop provided by said restriction drives fluid through the second conduit towards the downstream end of the second conduit, does not exclude the fluid being simultaneously urged through the second conduit also by other phenomena, such as a suction of the compressor, or a relatively high pressure at the second fluid source. Thereby, the pressure drop provided by said restriction contributes to urging the fluid through the second conduit towards the downstream end of the second conduit. The fluid may however be urged through the second conduit due solely to the pressure drop provided by said restriction.

Thereby, a simple and reliable way of driving the fluid from both sources may be provided. This will reduce risks of problems in the engine due to liquid formation.

Preferably, the restriction is created by the first conduit downstream end being in a vicinity of the rotor. Thereby, a reduction of the cross-sectional area of the flow coming out of the first conduit, and thereby the pressure drop, may be secured. The restriction may be arranged so that a cross-sectional area of a flow through the restriction is smaller than a cross-sectional area of the flow in the first conduit upstream of the first conduit downstream end. This will ensure a local increase of the flow speed, providing the pressure drop for driving the flow through the second conduit.

Preferably, compared to the first conduit, the second conduit extends further downstream in the air guide. Thereby, the downstream end of the second conduit may be, compared to the downstream end of the first conduit, further downstream in the air guide. Preferably, the downstream end of the second conduit is in a vicinity of said restriction. Thereby, it may be ensured that the downstream end of the second conduit is arranged so that the pressure drop provided by said restriction drives fluid through the second conduit.

Preferably, the distance between the downstream end of the second conduit and the downstream end of the first conduit is within 0-30 mm, more preferably 0-20 mm, for example 0-10 mm, or 0-5 mm. Thereby, the distance between the first and second conduit downstream ends may be suitable for a variety of vehicle internal combustion engines, such as engines for heavy duty vehicles, e.g. trucks. The sizes of the engine may range e.g. from 2, 4, 7 or 10 liters, to 20, 17, or 15 liters. Beneficially, the second conduit downstream end is as close as possible to the restriction. It should be noted that the second conduit downstream end may be downstream or upstream of the first conduit downstream end, or at the same air guide longitudinal position. The second conduit downstream end may be in relation to the first conduit downstream end displaced laterally in the air guide.

At least two of the fluid guiding elements may form a conduit outlet arrangement for injecting fluid into the air guide, upstream of the outlet of the compressor. More specifically, the downstream ends of the first and second conduits may form a conduit outlet arrangement for injecting fluid into the air guide. In particularly advantageous embodiments, the conduit outlet arrangement is, as seen in a transverse cross-section of the air guide, centrally arranged in the air guide. The conduit outlet arrangement is preferably arranged to inject the fluid guided by said at least two of the fluid guiding elements towards the centre of the rotor. More specifically, the conduit outlet arrangement is preferably arranged to inject the fluid guided by said first and second conduits towards the centre of the rotor. It is understood that the rotational axis of the rotor may be parallel to the local air flow upstream of the compressor; e.g. as in a centrifugal compressor. The rotational axis of the rotor advantageously extends through the downstream end of the first conduit.

The conduit outlet arrangement may comprise one or more nozzles, ejectors or dispersion devices. For example, one or both of the first and second conduit downstream ends may comprise a nozzle, an ejector or a dispersion device. By the injection towards the centre of the rotor, the risk that water from said fluid sources will damage the rotor is minimized. More specifically, since the linear velocity of the inner rotor part is, due to a smaller radial distance from the centre of rotation, smaller than the velocity of the outer rotor part, the impact velocity of water droplets will be smaller closer to the centre of the rotor.

In some embodiments, the conduit outlet arrangement and the rotor are partly integrated. Thereby, a portion of the rotor may extend into the conduit outlet arrangement. Preferably, the conduit outlet arrangement is located upstream of a high pressure part of the compressor. Preferably, the conduit outlet arrangement is located upstream of a part of the compressor in which part the fluid(s) is/are fully compressed. The compressor may be a centrifugal compressor comprising the rotor onto which blades are mounted. Preferably, the conduit outlet arrangement is located upstream of the blades. By means of the integration, e.g. by a portion of the rotor extending into the conduit outlet arrangement, the restriction may be created between the end of the first conduit and the rotor.

In alternative embodiments, the first conduit may terminate upstream of the compressor rotor. Thereby, a portion of the rotor may present a diameter that is close to the inner diameter of the first conduit. As suggested, the downstream end of the first conduit may be relatively close to the rotor portion. Thereby, the restriction is created between the downstream end of the first conduit and the rotor. Similarly to the embodiment described above, this will increase the local fluid speed and decrease the pressure at the end of the fluid guiding element, whereby fluids transported by the fluid guiding element may be driven by a pressure difference between one or more fluid sources from which the fluids are transported and the end of the fluid guiding element, serving to drive the fluids towards the end of the fluid guiding element.

Preferably, at least a part of one of the first conduit is integrated with at least a part of the second conduit so as to form an integrated fluid guiding element. The integrated fluid guiding element may terminate at the air guide. The integrated fluid guiding element may present a conduit for guiding a fluid from one of the fluid sources as well as a fluid from another of the fluid sources. Thereby, fluids from a plurality of sources may advantageously be injected towards the centre of the rotor of the compressor.

The first and second conduits are preferably concentrically arranged. Advantageously, said first and second conduits are concentrically arranged at the conduit outlet arrangement. Thereby, fluid from two or more fluid sources may be guided separately up to the conduit outlet arrangement, but nevertheless both injected towards the centre of the rotor of the compressor. The second conduit may surround the first conduit, as seen in a cross-section which is perpendicular to the fluid flow direction. By a portion of the rotor extending into the second conduit, the restriction may be readily created between the downstream end of the first conduit and the rotor.

According to another aspect of the invention, an internal combustion engine is provided, comprising
a compressor, and
an air guide arranged to guide an air flow from an air inlet to at least one cylinder of the engine via the compressor,
characterized in that the inlet system comprises at least two fluid sources, and at least two fluid guiding elements each arranged to guide a fluid from a respective of the fluid sources to the air guide, between the air inlet and an outlet of the compressor,
and that the fluid sources are liquid sources, and the fluid guiding elements are each arranged to guide a liquid from a respective of the liquid sources to the air guide, between the air inlet and the outlet of the compressor.

Thus, the fluid guiding elements may each be arranged to guide a liquid from a respective of the liquid sources to the air guide. Thereby, removal of liquid, e.g. provided due to condensation, may be provided in an effective manner. Thereby the risk of operational problems is greatly reduced.

The inlet system may comprise a valve arranged to control the communication between one of the liquid sources and the air guide via one of the fluid guiding elements based on an amount of liquid upstream of the valve. In some embodiments, said valve may be a float valve, or an electrically actuated, electronically controlled valve as exemplified below.

Such a valve provides means for reliably emptying liquid from the fluid source in a controlled manner. For example, where the fluid source is a charge air cooler, the valve provides means for disallowing compressed gas, rather than water, out of the charge air cooler, and this will prevent a loss of compressor power due to the fluid guiding element providing the communication between the charge air cooler and the air guide upstream of the outlet of the compressor. Also, the pressure differential over the compressor may vary and become insufficient in some operating conditions for driving water out of the cooler to the air guide upstream of the compressor. When this happens, a relatively large amount of water may accumulate in the cooler and then, upon a sudden change of operating conditions of engine, in systems without a communication between the cooler and the air guide via a fluid guiding element and without a valve for controlling the communication, the accumulated water could rush into the engine and cause undesirable effects. With the fluid guiding element and the valve it will be possible to avoid such large water accumulations.

Preferably, one of the fluid sources is a charge air cooler, the air guide being arranged to guide the air flow to the at least one cylinder via the charge air cooler, the charge air cooler being located downstream of the compressor. Thereby a condensed water delivery system may advantageously be provided, transporting water condensing in the charge air cooler up to the engine intake for suppression of NOx formation. The embodiment provides simple means of water delivery to engine intake by utilising the available air pressure difference to drive the water from the charge air cooler to the air guide upstream of the outlet of the compressor.

In some embodiments, one of the fluid sources is a crankcase of the engine or is adapted to communicate with a crankcase of the engine. One of the fluid guiding elements may be a crankcase ventilation conduit for ventilating a crankcase of the engine. In further embodiments, one of the fluid sources may be an oil separator adapted to clean crankcase gas of the engine. The crankcase gas may include blow-by gases which during engine operation enter the crankcase from the combustion chambers of the engine. Where the engine has a relatively high amount of water in the combustion process, the blow-by gases may present a relatively high humidity. Thereby the gases transported to the air duct by the crankcase ventilation conduit will contain water which will be transported to the air duct. Thus, an effective removal of water from the crankcase is provided, while said water may be due to the transportation to the air guide advantageously used for reduction of NOx formation in the cylinders.

In some embodiments, one of the fluid sources is a condensation water trap which may trap condensation water in an exhaust gas recirculation conduit for the engine. One of the fluid guiding elements may form a part of an exhaust gas recirculation conduit for the engine. The fluid source, from which said one of the fluid guiding elements is arranged to guide a fluid, may be an exhaust gas cooler arranged to cool exhaust gases in the exhaust gas recirculation conduit. By including such a water trap and/or an exhaust gas cooler in the inlet system in said manner, condensation water in the exhaust gas recirculation conduit may be effectively trapped and removed and used in the engine operation for reduction of NOx formation. The condensation water trap may be arranged to trap condensation water in the exhaust gas recirculation conduit. E.g., the trap may be provided as a pocket in the conduit, adapted to collect or trap condensation water. Alternatively the condensation water trap may be an area of the exhaust gas recirculation conduit where condensed water tends to collect without said area having been particularly designed for it. E.g. the condensation water trap may be a conduit turn or bend in which condensation water accumulates due to gravity.

Preferably, the condensation water trap is located downstream of the exhaust gas cooler. The fluid guiding element arranged to guide fluid from the condensation water trap may be arranged to guide the fluid to a conduit outlet arrangement as described above. Thereby a pressure differential may be provided to effectuate such a transport of fluid.

The inlet system may comprise in addition to said one of the fluid guiding elements an exhaust gas recirculation bypass conduit arranged to: guide exhaust gases from the exhaust gas recirculation conduit to the air guide while bypassing a part of said one of the fluid guiding elements and terminating at the air guide. The exhaust gas recirculation bypass conduit is preferably less restrictive than the bypassed part of said one of the fluid guiding elements. The inlet system preferably comprises a valve for controlling the flow through the exhaust gas recirculation bypass conduit.

In operational circumstances where there is little or no water condensation in the exhaust recirculation conduit, and any water therein is provided in a vaporized form, said valve may be open so as to allow recirculated exhaust gases to pass through the bypass conduit. However, when there is a risk of substantial water condensation, e.g. during cold engine operations, the valve may be closed to force recirculated exhaust gases to the conduit outlet arrangement so as to direct the condensate water into the centre of the compressor rotor. In systems where portions of the exhaust gas recirculation conduit, including the exhaust gas cooler, are located below the compressor, e.g. due to space restrictions, a particularly large amount of water may accumulate in the cooler and in various conduit pockets and turns, and thereby guiding the water in said manner according to embodiments of the invention to the compressor rotor centre will be especially advantageous. As suggested, the bypassed part of said one of the fluid guiding elements may be more restrictive than the exhaust gas recirculation bypass conduit. This will facilitate allowing the conduit outlet arrangement to inject fluid towards the centre of the rotor. More specifically, a relatively restrictive conduit outlet arrangement will provide for concentrating the injected fluid towards the rotor centre.

It is understood that various combinations of fluid sources are possible within the scope of the invention. In particularly advantageous embodiments, one of the fluid sources is a charge air cooler, the air guide being arranged to guide the air flow to the at least one cylinder via the charge air cooler, the charge air cooler being located downstream of the compressor, and one of the fluid sources is a crankcase of the engine, is adapted to communicate with a crankcase of the engine, or is an oil separator adapted to clean crankcase gas of the engine. In further advantageous embodiments one of the fluid sources is a charge air cooler, and one of the fluid sources forms a part of an exhaust gas recirculation conduit for the engine. In some embodiments, one of the fluid sources is a charge air cooler, and one of the fluid sources is a condensation water trap which may trap condensation water in an exhaust gas recirculation conduit for the engine.

Preferably, at least a part of one of the fluid guiding elements is integrated with at least a part of another of the fluid guiding elements so as to form an integrated fluid guiding element. The integrated fluid guiding element may terminate at the air guide. The integrated fluid guiding element may present a conduit for guiding a fluid from one of the fluid sources as well as a fluid from another of the fluid sources. Thereby, fluids from a plurality of sources may advantageously be injected towards the centre of the rotor of the compressor.

In some embodiments, the integrated fluid guiding element presents a first conduit for guiding a fluid from one of the fluid sources, and a second conduit for guiding a fluid from another of the fluid sources. The first and second conduits are preferably concentrically arranged. Advantageously, said at least two fluid guiding elements are concentrically arranged at the conduit outlet arrangement. Thereby, fluid from two or more fluid sources may be guided separately up to the conduit outlet arrangement, but nevertheless both injected towards the centre of the rotor of the compressor.

An aspect of the invention provides an inlet system for an internal combustion engine, comprising
a compressor, and
an air guide arranged to guide an air flow from an air inlet to at least one cylinder of the engine via the compressor,
characterized in that the inlet system comprises a fluid source, and a fluid guiding element arranged to guide a fluid from the fluid source to the air guide, that the compressor comprises a rotor, that the inlet system comprises a conduit outlet arrangement for injecting fluid guided by the fluid guiding element into the air guide and towards the centre of the rotor, and that a restriction of a flow of the injected fluid is provided by the conduit outlet arrangement and the rotor.

Thus, a restriction of a flow of the injected fluid may be provided by the conduit outlet arrangement and the rotor, or a portion of the rotor. The restriction may be created between the end of the fluid guiding element and the rotor. The restriction may provide for the flow cross-sectional area to decrease at the end of the fluid guiding element or as the fluid leaves the fluid guiding element. This will increase the local fluid speed and decrease the pressure at the end of the fluid guiding element.

Said aspect of the invention may be provided in any embodiment described herein. Preferably, a portion of the rotor extends into the conduit outlet arrangement. Preferably, the conduit outlet arrangement is, as seen in a transverse cross-section of the air guide, centrally arranged in the air guide. It is understood that the inlet system in which a restriction of a flow of the injected fluid is provided as stated by the conduit outlet arrangement and the rotor may be combined with any suitable aspect or embodiment described herein.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
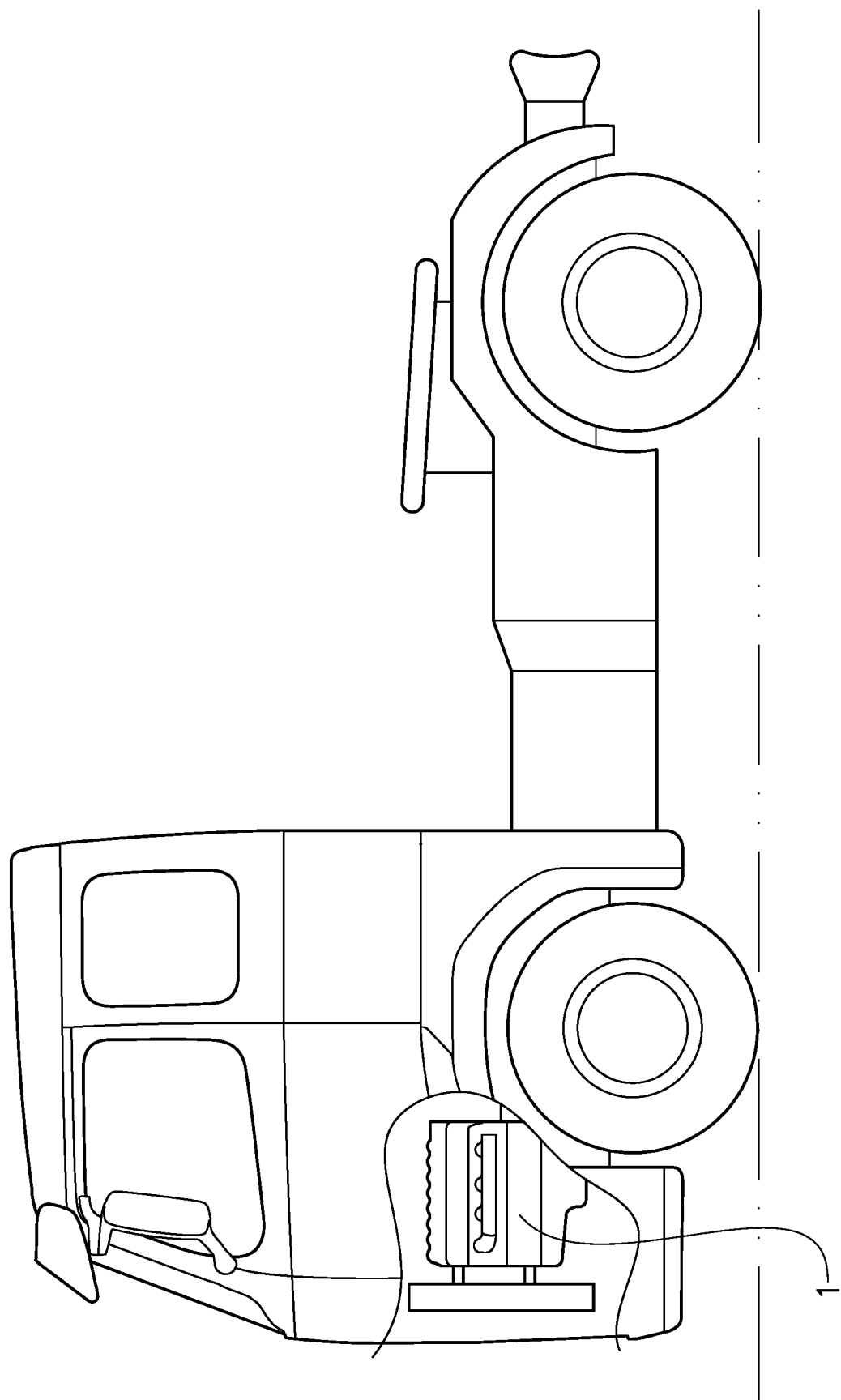
FIG. 1 is a side view of a vehicle in the form of a truck.

FIG. 1 shows a vehicle in the form of a truck, or a tractor for a semitrailer. It should be noted that the vehicle can be of a variety of alternative types, e.g. it may be a car, a bus, or a working machine such as a wheel loader. The vehicle comprises an internal combustion engine system with an internal combustion engine 1 with a plurality of cylinders. It should be noted that the invention is applicable to engines with any number of cylinders, even with a single cylinder. Also, the invention is applicable to engines with any cylinder configuration, e.g. an in-line configuration or a V-configuration.

Figure 2:
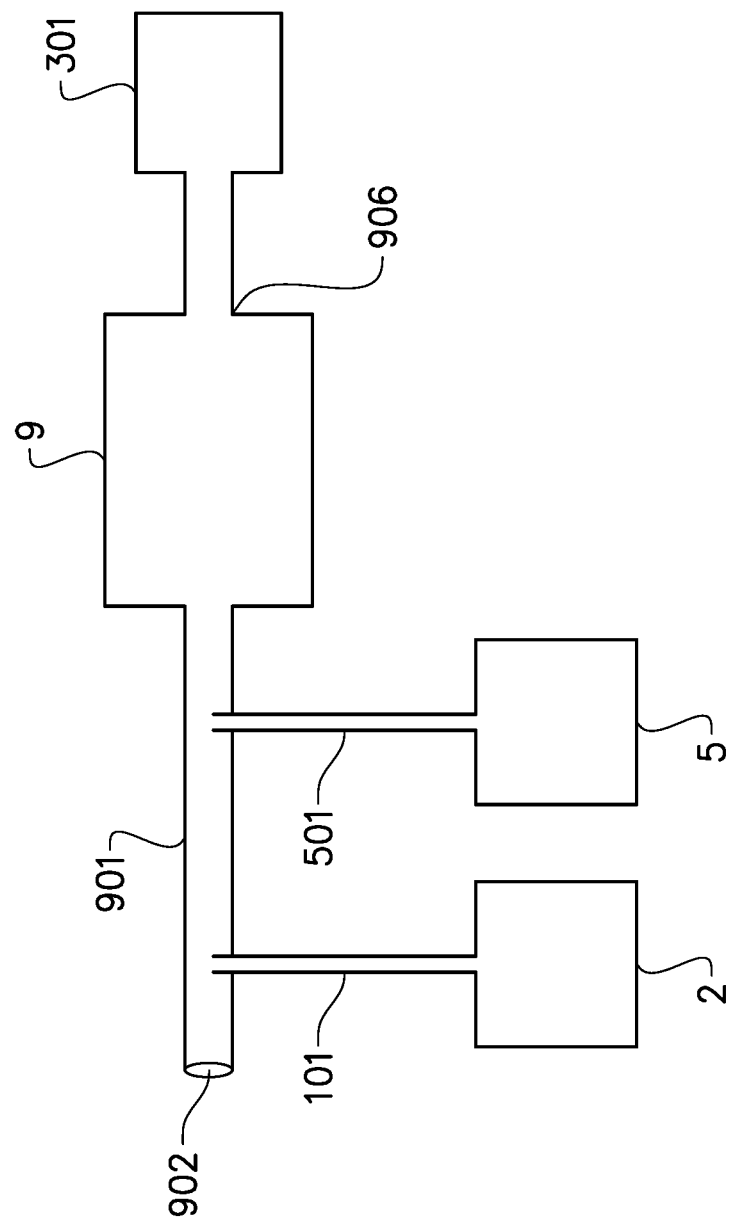
FIG. 2 is a schematic view of an inlet system for an internal combustion engine.

FIG. 2 depicts schematically an inlet system for an internal combustion system, according to an embodiment of the invention. The inlet system comprises a compressor 9, and an air guide 901 arranged to guide an air flow from an air inlet 902 to at least one cylinder 301 of the engine via the compressor 9. The inlet system further comprises two fluid sources 2, 5, and two fluid guiding elements 101, 501 each arranged to guide a fluid from a respective of the fluid sources 2, 5 to the air guide 901, between the air inlet 902 and an outlet 906 of the compressor 9.

Figure 3:
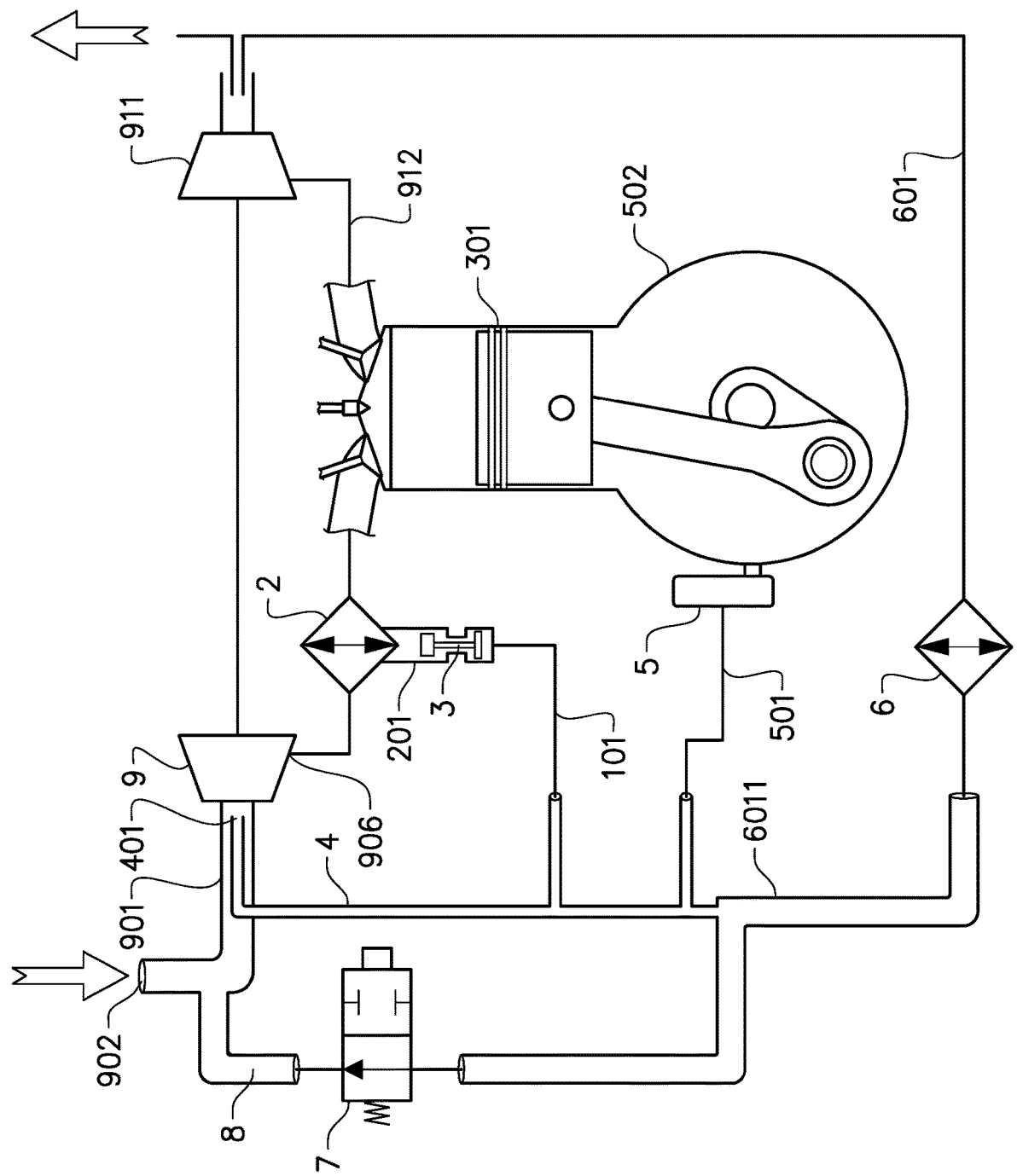
FIG. 3 is a schematic drawing of an internal combustion engine system in the vehicle in FIG. 1.

The internal combustion engine system in the vehicle in FIG. 1 is schematically depicted in FIG. 3. In FIG. 3 only one of the cylinders 301 of the engine is depicted. Each cylinder presents a piston connected to a crankshaft, which is located in a crankcase 502 of the engine.

The internal combustion engine system comprises for the engine an inlet system. The inlet system comprises a compressor 9, and an air guide 901 arranged to guide an air flow from an air inlet 902 to the cylinders 301 of the engine 1 via the compressor 9.

The compressor 9 is a part of a turbocharger, also comprising a turbine 911 which is fixedly connected to the compressor and arranged to be driven by exhaust gases from the cylinder 301, guided by an exhaust guide 912, as is known per se. Thereby, the compressor 9 is arranged to compress air in the air guide 901. Alternatively, the compressor 9 may be driven in some other suitable manner, for example by the engine camshaft, e.g. via a belt, or by an electric motor.

The inlet system also comprises a first fluid source 2 in the form of a charge air cooler located in the air guide 901, downstream of the compressor 9. The charge air cooler comprises a bottom part 201 arranged to collect a fluid in the form of condensed water formed in the charge air cooler 2. A first fluid guiding element 4, 101, in the form of a water conduit, is arranged to guide the water from the bottom part 201 to a conduit outlet arrangement 401, closer described below, in the air guide 901, between the air inlet 902 and an outlet 906 of the compressor 9, more specifically, between the air inlet 902 and a rotor of the compressor.

The inlet system further comprises a valve 3 arranged to control the communication between the charge air cooler 2 and the air guide 901 based on an amount of water in the bottom part 201. In this embodiment, the valve is a float valve 3, with a float in the bottom part 201, fixed to shutter arranged to block the water conduit 101. Thereby, gas escape from the charge air cooler is minimized. Alternatively, a simpler arrangement may be utilized, where the connection between the bottom part 201 of the charge air cooler 2 and the first fluid guiding element 4, 101 is effected via a relatively small restrictor orifice, big enough to allow water removal but small enough to limit the energy loss due to pumping the gas in and out of the compressor.

The inlet system further comprises a second fluid source 5 in the form of an oil separator 5 arranged to communicate with the crankcase 502 of the engine. The separator 5 is adapted to clean crankcase gas of the engine from oil as is known per se. A second fluid guiding element 4, 501, in the form of a crankcase ventilation conduit, is arranged to guide a fluid in the form of the cleaned crankcase gases from the oil separator 5 to the air guide 901, between the air inlet 902 and the outlet 906 of the compressor 9, more specifically, between the air inlet 902 and the rotor of the compressor 9.

A part of the second fluid guiding element 501 is integrated with a part of the first fluid guiding element 101 so as to form an integrated fluid guiding element 4. The integrated fluid guiding element presents a conduit 4 for guiding fluid from the charge air cooler 2 as well as fluid from the oil separator 5. The integrated fluid guiding element 4 terminates at the air guide 901, more specifically at the conduit outlet arrangement 401 described closer below.

The crankcase ventilation conduit 501, 4 is arranged to ventilate the crankcase 502. The crankcase gas may include blow-by gases which during engine operation enter the crankcase from the combustion chambers in the cylinders 301. Where the engine has a relatively high amount of water in the combustion process, the blow-by gases may present a relatively high humidity. Thereby the gases transported to the air duct by the crankcase ventilation conduit 501, 4 will contain water which will be transported to the air duct 901.

The engine system comprises an exhaust gas recirculation conduit 601 arranged to guide exhaust gases from a location in the exhaust guide 912 downstream of the turbine 911, to the air duct 901, between the air inlet 902 and the compressor 9. An exhaust gas cooler 6 is arranged to cool exhaust gases in the exhaust gas recirculation conduit 601. Thereby, a part of the exhaust gas recirculation conduit 601 extending between the exhaust gas cooler 6 and the air duct forms what is herein referred to as a third fluid guiding element 6011. Thus, the engine system comprises a so called long-route EGR system. However the invention is also applicable to engine systems with so called short-route EGR systems in which the EGR circuit is fed from upstream of the turbine.

A part of the third fluid guiding element 6011 forms a part of the integrated fluid guiding element 4. Thus, said part of the third fluid guiding element 6011 is integrated with the parts of the first and second fluid guiding elements 101, 501. The integrated fluid guiding element is thus arranged to guide fluid from the exhaust gas cooler 6 as well as fluid from the charge air cooler 2 and fluid from the oil separator 5.

During engine operation, a relatively large amount of condensation water may form in the exhaust gas cooler 6. By means of the third fluid guiding element 6011, this water may be transported to the conduit outlet arrangement 401 described below.

The conduit outlet arrangement 401 is provided for injecting the water containing fluid from the charge air cooler 2, the oil separator 5 and the exhaust gas cooler 6, into the air guide 901, upstream of the compressor 9. The conduit outlet arrangement 401 is, as seen in a transverse cross-section of the air guide 901, centrally arranged in the air guide 901. More specifically, a nozzle of the conduit outlet arrangement 401 is, as seen in a transverse cross-section of the air guide 901, centrally arranged in the air guide 901.

The compressor 9 is a centrifugal compressor comprising as suggested a rotor. The conduit outlet arrangement 401 is arranged to deliver the fluid from the charge air cooler 2, the oil separator 5 and the exhaust gas cooler 6, towards the centre of the rotor. Thereby, the risk that water from said fluid sources 2, 5, 6 will damage the rotor is minimized. More specifically, since the linear velocity of the inner rotor part is, due to a smaller radial distance from the centre of rotation, smaller that the velocity of the outer rotor part, the impact velocity of water droplets will be smaller at the centre of the rotor.

Figure 4:
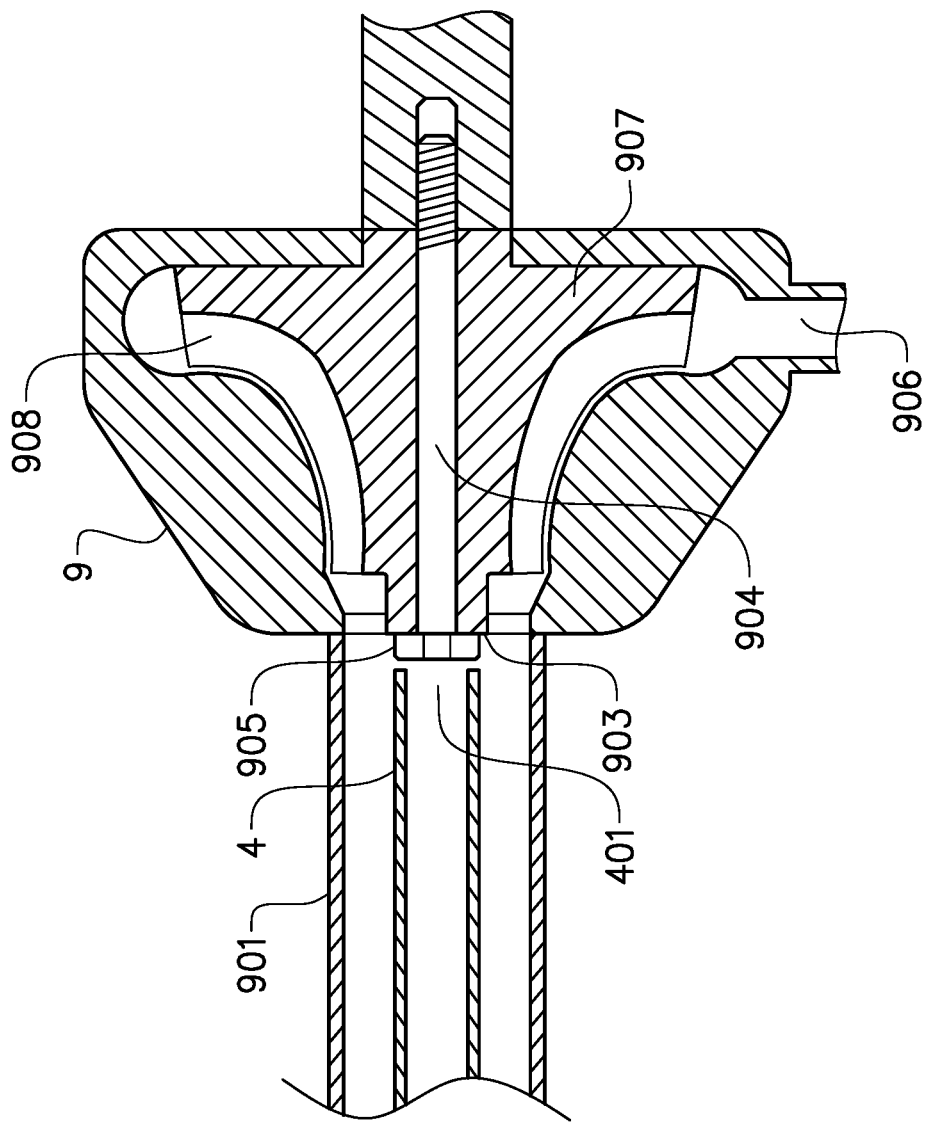
FIG. 4 shows a cross-sectional view of a detail in FIG. 3.

As suggested in FIG. 4, the rotor 907 of the compressor 9 comprises a rotor body 903 with blades 908 for compressing the air, and also a rotor shaft 904. Downstream of the blades 908 and upstream of the compressor outlet 906, the compressor 9 presents a high pressure part in which the fluids entering the compressor are fully compressed, i.e. compressed according to the capacity of the compressor in the operational circumstances. At the centre of the rotor 907 the rotor body 903 is mounted on the rotor shaft by means of a bolt 904 with a head 905. The integrated fluid guiding element 4 terminates upstream of the rotor 907.

The bolt head 905 presents a diameter that is close to the inner diameter of the integrated fluid guiding element 4, and the end of the integrated fluid guiding element 4 is relatively close to the bolt head 905. Thereby, a restriction is created between the end of the first conduit 4 and the rotor 907. This will increase the local fluid speed and decrease the pressure, or retain a negative pressure created by the rotor, to which the end of the integrated fluid guiding element 4 is exposed. Thereby, fluids transported by the integrated fluid guiding element 4 may be driven by a pressure difference between the fluid sources 2, 5, 6 from which the fluids are transported and the end of the integrated fluid guiding element 4, serving to drive the fluids towards the conduit outlet arrangement 401.

Reference is made again to FIG. 3. The inlet system further comprises an exhaust gas recirculation bypass conduit 8 arranged to guide exhaust gases from the part of the exhaust gas recirculation conduit 601 forming the third fluid guiding element 6011, to the air guide 901 while bypassing a part of the third fluid guiding element 6011. In this embodiment, the exhaust gas recirculation bypass conduit 8 bypasses the integrated fluid guiding element 4, and terminates in the air guide 901, between the air inlet 902 and the conduit outlet arrangement 401.

The exhaust gas recirculation bypass conduit 8 is less restrictive than the integrated fluid guiding element 401. The inlet system further comprises a valve 7 for controlling the flow through the exhaust gas recirculation bypass conduit 8. The valve 7 may be opened, e.g. by control of an electronic control unit (not shown), in operational conditions where the temperature downstream of the exhaust gas cooler 6 is high enough to preclude formation of any condensed water. The control of the valve 7 may be based on signals from a temperature sensor downstream of the exhaust gas cooler 6.

Figure 5:
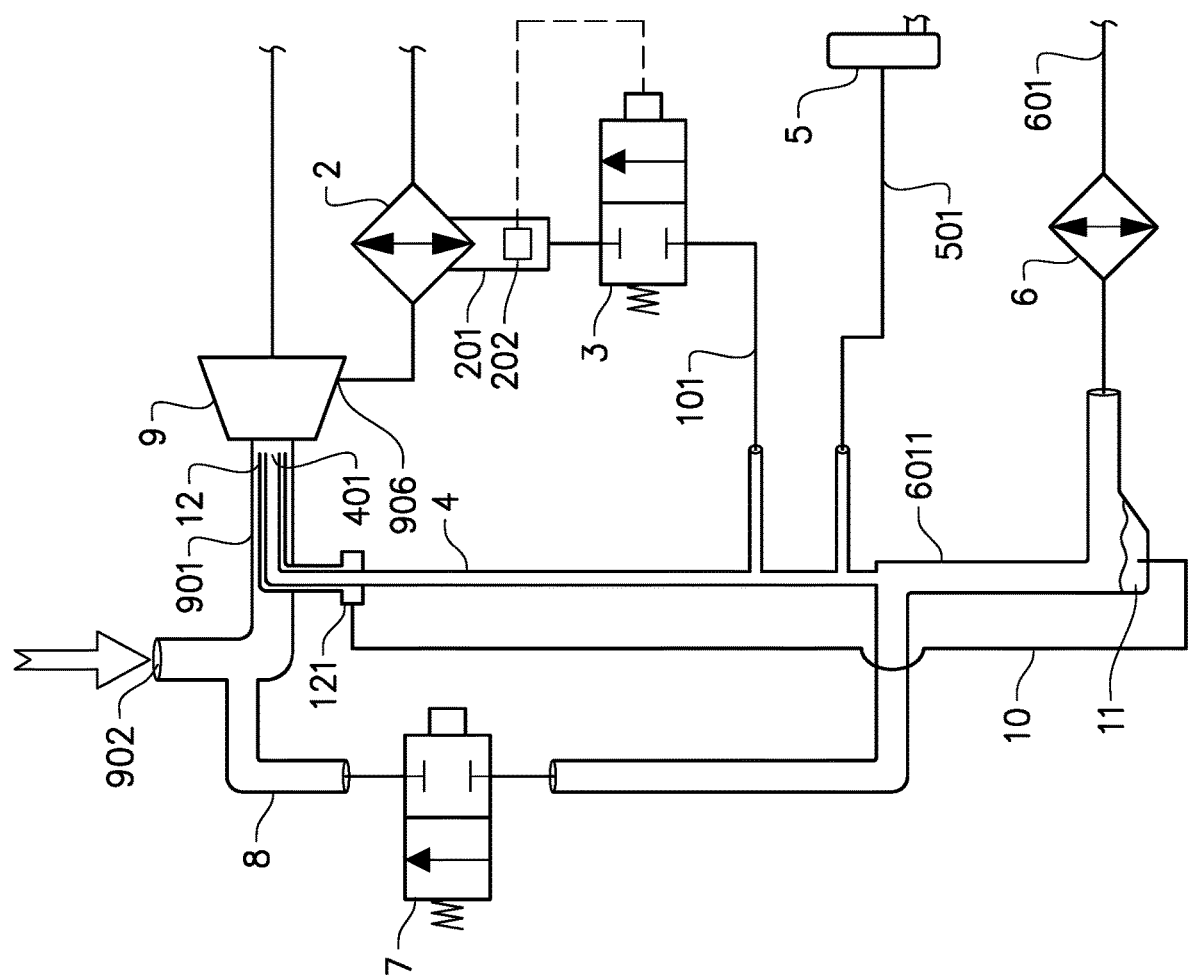
FIG. 5 shows an inlet system for an internal combustion engine, according to an alternative embodiment of the invention.

Reference is made to FIG. 5 depicting an inlet system according to an alternative embodiment. The embodiment shares features with the embodiment described above with reference to FIG. 3, but presents the following differences:

In addition to the first, second and third fluid sources 2, 5, 6, the inlet system in FIG. 5 comprises a fourth fluid source 11 in the form of a condensation water trap 11 arranged to trap condensation water in the exhaust gas recirculation conduit 601. The condensation water trap 11 is provided as a pocket in the conduit 601, and is located downstream of the exhaust gas cooler 6. A fourth fluid guiding element 10 is arranged to guide a fluid from the fourth fluid source 11 to the conduit outlet arrangement 401.

A part of the fourth fluid guiding element 10 is integrated with parts of the first, second and third fluid guiding elements 101, 501, 6011 so that the first, second, third and fourth fluid guiding elements 101, 501, 6011, 10 form an integrated fluid guiding element 4, 12. The integrated fluid guiding element presents a first conduit 4 arranged to guide fluids from the first, second and third fluid sources 2, 5, 6. The integrated fluid guiding element further presents a second conduit 12 arranged to guide fluid from the fourth fluid source 11. A separated part of the fourth fluid guiding element 10 extends from the fourth fluid source to an upstream end 121 of the second conduit. The upstream end 121 of the second conduit 12 has an increased radial extension to provide for a beneficial distribution of the fluid delivered by the separated part of the fourth fluid guiding element 10.

The first and second conduits are coaxially arranged whereby the second conduit 12 is arranged externally of the first conduit 4. This coaxial arrangement continues all the way to the conduit outlet arrangement 401 where fluids from both conduits are injected towards the centre of the rotor of the compressor 9, similarly as described above. For this the conduit outlet arrangement 401 presents two coaxial nozzles, each arranged to receive fluid guided by a respective of the first and second conduits 4, 12. The coaxial arrangement is thus provided as a double-walled pipe.

Figure 6:
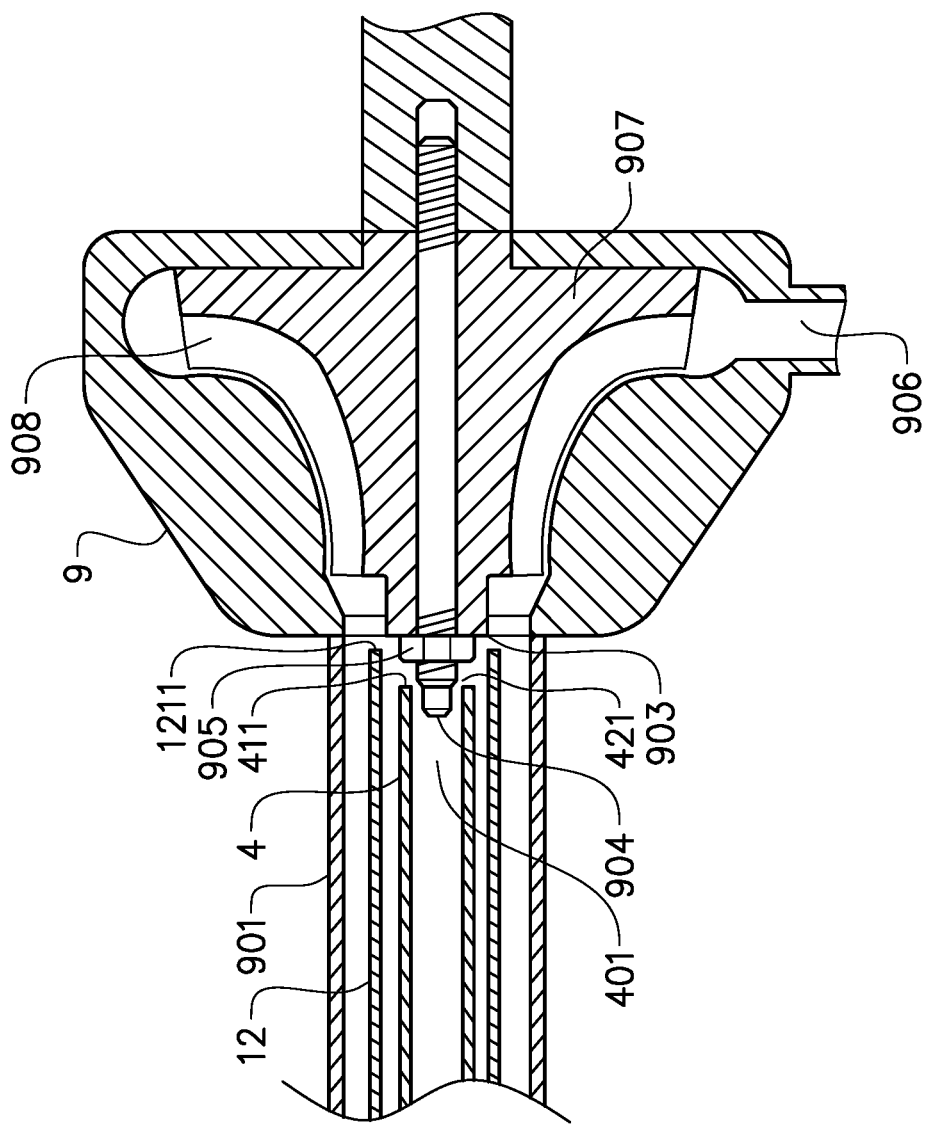
FIG. 6 shows a cross-sectional view of a detail in FIG. 5.

As suggested in FIG. 6, the rotor 907 of the compressor 9 comprises a rotor body 903 with blades 908 for compressing the air, and also a rotor shaft 904. Downstream of the blades 908 and upstream of the compressor outlet 906, the compressor 9 presents a high pressure part in which the fluids entering the compressor are fully compressed, i.e. compressed according to the capacity of the compressor in the operational circumstances. At the centre of the rotor 907 the rotor body 903 is mounted on the rotor shaft 904 by means of a retaining nut 905. At the conduit outlet arrangement 401 the shaft 904 extends somewhat into the first conduit 4. It is understood that a rotational axis of the rotor 907 extends through a downstream end 411 of the first conduit 4. Further, compared to the first conduit 4, the second conduit 12 extends further towards the rotor body 903, i.e. further downstream in the air guide 901. Thereby, the rotor shaft 904 and the retaining nut 905 extends into the second conduit 12. The conduits 4, 12 terminate upstream of blades 908 of rotor 907.

Thus, the conduit outlet arrangement 401 and the rotor 907 are partly integrated by a portion of the rotor 907 extending into the conduit outlet arrangement 401. By a portion of the rotor 907 extending into the conduit outlet arrangement, a restriction 421 is created between the downstream end 411 of the first conduit 4 and the rotor 907. This will increase the local fluid speed and decrease the pressure at the end of the first conduit 4. Thereby, fluids transported by the first conduit may be driven by a pressure difference between the fluid sources 2, 5, 6 from which the fluids are transported and the end of the first conduit, serving to drive the fluids towards the conduit outlet arrangement 401. The compressor may contribute to this pressure difference.

In addition, since compared to the first conduit 4, the second conduit 12 extends further downstream in the air guide 901, the low pressure given as a result of the restriction 421 provided by the first conduit 4 and the rotor 907, may serve also to drive fluid through the second conduit towards the conduit outlet arrangement 401, more specifically towards a downstream end 1211 of the second conduit 12. In addition, the retaining nut 905 extending into the second conduit 12 provides a reduction of the impact diameter on the rotor. In alternative embodiments, the retaining nut 905 may present a diameter that is close to the inner diameter of the second conduit 12, and a restriction may be achieved by positioning the opening of the second conduit 12 close to the retaining nut 905 without the latter extending into the second conduit 12.

It is understood that the restriction 421 is created by the first conduit downstream end 411 being in a vicinity of the rotor 907. It is further understood that the restriction 421 is arranged so that a cross-sectional area of a flow through the restriction is smaller than a cross-sectional area of the flow in the first conduit 4 upstream of the first conduit downstream end 411. In addition, it is understood that the downstream end 1211 of the second conduit 12 is in a vicinity of said restriction 421.

In the embodiment in FIG. 5, the valve 3 for controlling the communication between the charge air cooler 2 and the conduit outlet arrangement 401 is provided in the form of an electronically controlled, electrically actuated valve 3. The valve 3 is controlled based on a sensor 202 in the bottom part 201 of the charge air cooler 2, which sensor is arranged to provide signals indicative of the water level in the bottom part 201.

Figure 7:
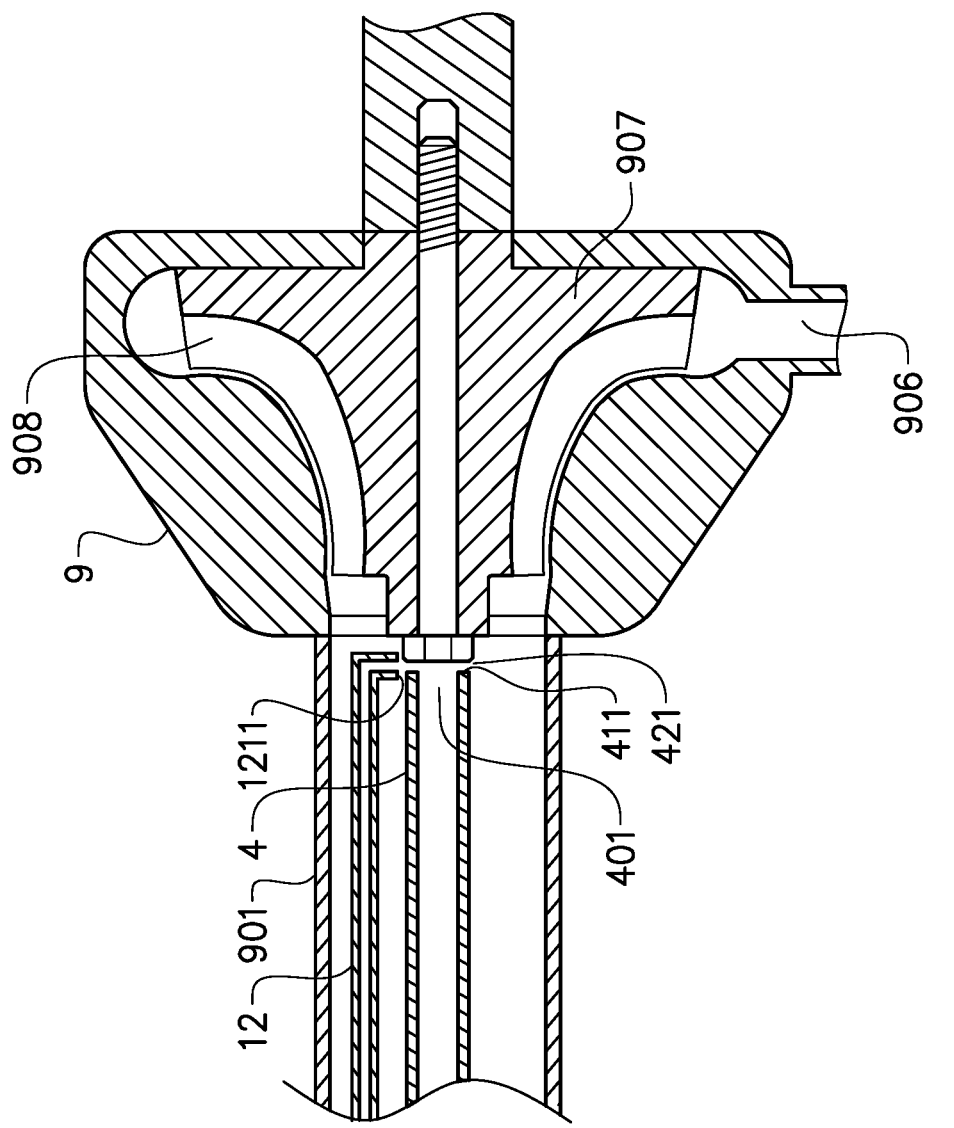
FIG. 7 and FIG. 8 show views of longitudinal cross-sections of air guides in inlet systems according to further embodiments of the invention.

FIG. 7 shows a part of an inlet system according to a further embodiment. The embodiment is similar to the one described with reference to FIG. 6, except as follows:

As in FIG. 6, the first conduit 4 is, towards its downstream end, centrally located in the air guide 901. Thereby, a rotational axis of the rotor 907 extends through the downstream end 411 of the first conduit 4. However, the second conduit 12 is offset from the center of the air guide 901, and extends in parallel with the first conduit 4. The second conduit 12 extends at a distance from the first conduit 4. A restriction 421 of a flow from the first conduit is provided by a downstream end 411 of the first conduit 4 and the rotor 907. The restriction 421 is created by the first conduit downstream end 411 being in a vicinity of the rotor 907. The restriction 421 is arranged so that a cross-sectional area of a flow through the restriction is smaller than a cross-sectional area of the flow in the first conduit 4 upstream of the first conduit downstream end 411.

Compared to the first conduit 4, the second conduit 12 extends further downstream in the air guide 901. At the restriction 421, the second conduit 12 is curved so at to point radially inwards. Thereby, the downstream end 1211 of the second conduit 12 is in a vicinity of said restriction 421. Thus, the downstream end 1211 of the second conduit 12 is arranged so that a pressure drop provided by said restriction 421 drives fluid through the second conduit towards the downstream end of the second conduit.

Figure 8:
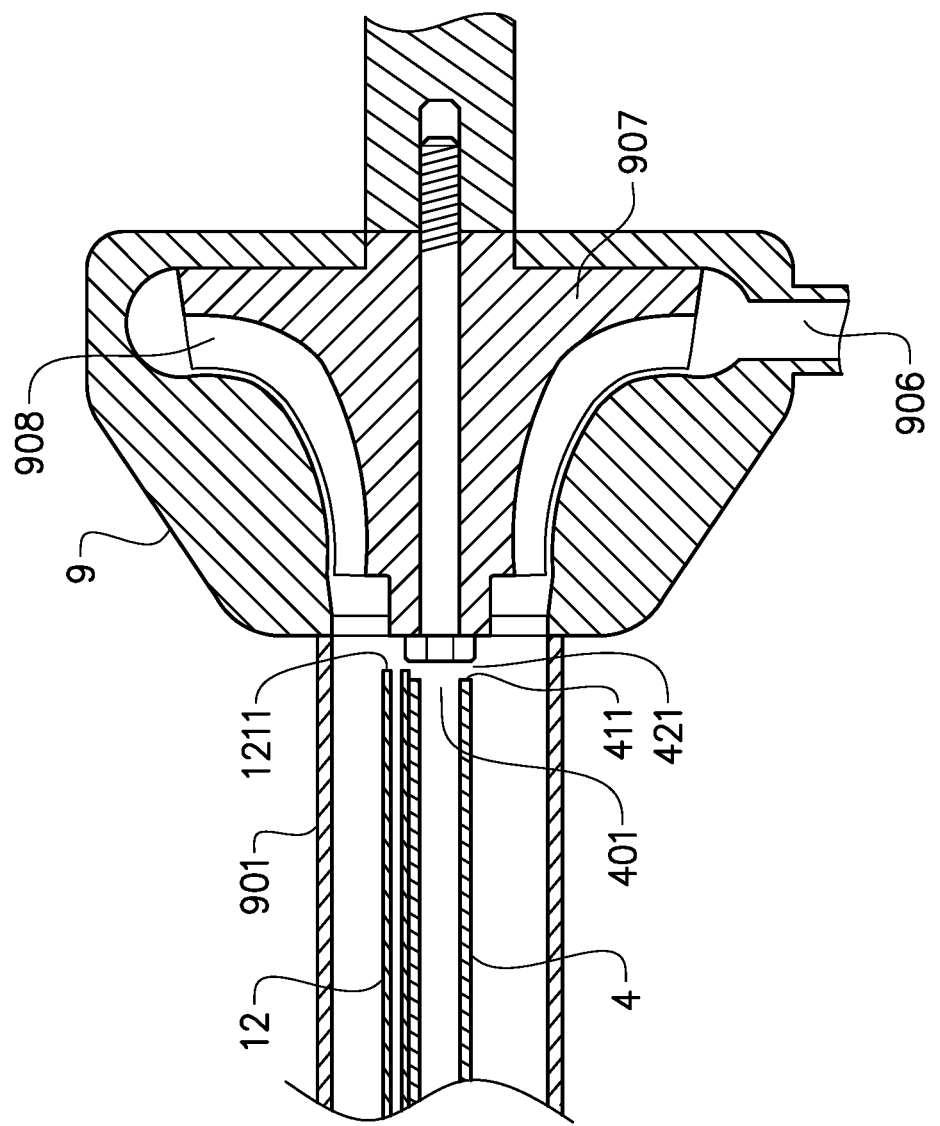

FIG. 8 shows a part of an inlet system according to yet another embodiment. The embodiment is similar to the one described with reference to FIG. 7, except as follows:

As in FIG. 7, the second conduit 12 is offset from the center of the air guide 901, and extends in parallel with the first conduit 4. However, the second conduit 12 is adjacent to, or close to, the first conduit 4. Compared to the first conduit 4, the second conduit 12 extends further downstream in the air guide 901. At the restriction 421, the downstream end 1211 of the second conduit 12 is provided. Thus, the downstream end 1211 of the second conduit 12 is arranged so that a pressure drop provided by said restriction 421 drives fluid through the second conduit towards the downstream end of the second conduit.

In alternative embodiments, the second conduit 12 does not extend, compared to the first conduit 4, further downstream in the air guide 901. Instead, the first and second conduits 4, 12 may extend to substantially the same longitudinal position in the air guide 901.

In further embodiments, a plurality of second conduits 12 may be provided. For example, instead of a single second conduit for guiding a fluid from the second fluid source, a plurality of second conduits may be arranged to guide the fluid from the second fluid source. Thereby, the diameter of each second conduit may be made relatively small, and the second conduit outlets may be placed around the first conduit outlet, so that the flows exiting second conduits are kept relatively close to the rotor center, to reduce wear of the latter. Thereby, the restriction of the flow of the fluid from the first fluid source, provided by the downstream end of the first conduit 4 and the rotor, may provide a pressure drop serving to drive the fluid through the second conduits towards the downstream ends of the second conduits.

It is to be understood that the present invention is not limited to the embodiments described above and illustrated in the drawings; rather, the skilled person will recognize that many changes and modifications may be made within the scope of the appended claims.

The invention claimed is:

1. An inlet system for an internal combustion engine, comprising
   a compressor comprising a rotor, and
   an air guide arranged to guide an air flow from an air inlet to at least one cylinder of the engine via the compressor,
   wherein the inlet system comprises at least two fluid sources, and at least two fluid guiding elements each arranged to guide a fluid from a respective of the fluid sources to the air guide, between the air inlet and an outlet of the compressor, and
   the fluid guiding elements present a first conduit for guiding a fluid from a first of the fluid sources, and a second conduit for guiding a fluid from a second of the fluid sources, wherein a restriction of a flow of the fluid from the first fluid source is provided by a downstream end of the first conduit and the rotor, whereby a downstream end of the second conduit is arranged so that a pressure drop provided by the restriction drives fluid through the second conduit towards the downstream end of the second conduit.

2. An inlet system according to claim 1, wherein the restriction is created by the first conduit downstream end being in a vicinity of the rotor.

3. An inlet system according to claim 1, wherein the restriction is arranged so that a cross-sectional area of a flow through the restriction is smaller than a cross-sectional area of the flow in the first conduit upstream of the first conduit downstream end.

4. An inlet system according to claim 1, wherein a rotational axis of the rotor extends through the downstream end of the first conduit.

5. An inlet system according to claim 1, wherein compared to the first conduit, the second conduit extends further downstream in the air guide.

6. An inlet system according to claim 1, wherein the downstream end of the second conduit is in a vicinity of the restriction.

7. An inlet system according to claim 1, wherein the distance between the downstream end of the second conduit and the downstream end of the first conduit is within 0-30 mm.

8. An inlet system according to claim 1, wherein the downstream ends of the first and second conduits form a conduit outlet arrangement for injecting fluid into the air guide.

9. An inlet system according to claim 8, wherein the conduit outlet arrangement is, as seen in a transverse cross-section of the air guide, centrally arranged in the air guide.

10. An inlet system according to claim 8, wherein the conduit outlet arrangement is arranged to inject the fluid guided by the first and second conduits towards the centre of the rotor.

11. An inlet system according to claim 1, wherein a rotational axis of the rotor extends through the downstream end of the first conduit.

12. An inlet system according to claim 1, wherein the downstream ends of the first and second conduits form a conduit outlet arrangement, a portion of the rotor extending into the conduit outlet arrangement.

13. An inlet system according to claim 1, wherein at least a part of the first conduit is integrated with at least a part of the second conduit so as to form an integrated fluid guiding element.

14. An inlet system according to claim 1, wherein the first and second conduits are concentrically arranged.

15. An inlet system according to claim 1,
wherein the fluid sources are liquid sources, and the fluid guiding elements are each arranged to guide a liquid from a respective of the liquid sources to the air guide, between the air inlet and the outlet of the compressor.

16. An inlet system according to claim 15, wherein the inlet system comprises a valve arranged to control the communication between one of the liquid sources and the air guide via one of the fluid guiding elements based on an amount of liquid upstream of the valve.

17. An inlet system according to claim 16, wherein the valve is a float valve.

18. An inlet system according to claim 1, wherein one of the fluid sources is a charge air cooler, the air guide being arranged to guide the air flow to the at least one cylinder via the charge air cooler, the charge air cooler being located downstream of the compressor.

19. An inlet system according to claim 1, wherein one of the fluid sources is a crankcase of the engine or is adapted to communicate with a crankcase of the engine.

20. An inlet system according to claim 1, wherein one of the fluid guiding elements is a crankcase ventilation conduit (501) for ventilating a crankcase of the engine.

21. An inlet system according to claim 1, wherein one of the fluid sources is an oil separator adapted to clean crankcase gas of the engine.

22. An inlet system according to claim 1, wherein one of the fluid sources is a condensation water trap which may trap condensation water in an exhaust gas recirculation conduit for the engine.

23. An inlet system according to claim 1, wherein one of the fluid guiding elements forms a part of an exhaust gas recirculation conduit for the engine.

24. An inlet system according to claim 23, wherein the fluid source, from which the one of the fluid guiding elements is arranged to guide a fluid, is an exhaust gas cooler arranged to cool exhaust gases in the exhaust gas recirculation conduit.

25. An inlet system according to claim 23, wherein the inlet system comprises in addition to the one of the fluid guiding elements an exhaust gas recirculation bypass conduit arranged to guide exhaust gases from the exhaust gas recirculation conduit to the air guide while bypassing a part of the one of the fluid guiding elements and terminating at the air guide.

26. An inlet system according to claim 25, wherein the exhaust gas recirculation bypass conduit is less restrictive than the bypassed part of the one of the fluid guiding elements.

27. An inlet system according to claim 25, wherein the inlet system comprises a valve for controlling the flow through the exhaust gas recirculation bypass conduit.

28. An internal combustion engine system comprising an inlet system according to claim 1.

29. A vehicle comprising an internal combustion engine system according to claim 28.

* * * * *